UNITED STATES PATENT OFFICE.

JOSEPH BRADFORD CLEAVER, OF BOUND BROOK, NEW JERSEY.

ANTIFRICTION COMPOSITION.

SPECIFICATION forming part of Letters Patent No. 507,969, dated October 31, 1893.

Application filed March 30, 1893. Serial No. 468,344. (Specimens.)

*To all whom it may concern:*

Be it known that I, JOSEPH BRADFORD CLEAVER, a citizen of the United States, residing at Bound Brook, in the county of Somerset, in the State of New Jersey, have invented new and useful Improvements in Antifriction Compositions, of which the following is a specification.

My invention relates to that class of compositions of matter especially adapted for use in the manufacture therefrom of axleboxes and bearings for shafts or other like purposes.

My invention consists of a combination of ingredients assembled as hereinafter set forth.

The ingredients which I use in preparing my composition of matter are particles of silk, a fatty substance and plumbago. The fatty substances which I can use in preparing my composition are oils such as linseed oil or other vegetable oils, sperm oil or other animal oils or fats such as tallow, petroleum or other mineral fats such as paraffine and in preparing my composition I take to one pound of particles of silk about six pounds of plumbago and two pounds of heavy petroleum and mix these ingredients so as to produce as near as possible a homogeneous mass. After the ingredients have been mixed together as above stated the mixture is pressed into the required form.

I do not confine myself strictly to the proportions named as I have found that all of them may be varied within certain limits and yet produce an effectvie material for the manufacture of a tough, hard and self lubricating axlebox washer or packing, but I have found in practice that the best results are secured by the combination in the proportions above named.

The silk filaments or fiber possess advantages over wooden fiber, in that the silk filaments or fiber offer less frictional resistance, and reduce friction to a minimum, while the bearing made from the composition is less liable to disintegrate as the silk fibers are long and tough and not reduced to a powder. The silk filaments or fiber render the composition durable and materially increase its wearing qualities, and I have discovered that silk filaments or fiber are in many respects important and valuable as the basis for the composition.

What I claim as new, and desire to secure by Letters Patent, is—

A composition of matter consisting of particles of silk, a fatty substance and plumbago substantially as described.

In testimony whereof I have hereunto set my hand in the presence of two subscribing witnesses.

JOSEPH BRADFORD CLEAVER.

Witnesses:
W. HAUFF,
E. F. KASTENHUBER.